(12) United States Patent
Weber

(10) Patent No.: US 9,651,420 B2
(45) Date of Patent: May 16, 2017

(54) LIGHT SENSOR ASSEMBLY

(71) Applicant: Tyco Electronics Corporation, Berwyn, PA (US)

(72) Inventor: Ronald Martin Weber, Annville, PA (US)

(73) Assignee: TE CONNECTIVITY CORPORATION, Berwyn, PA (US)

( * ) Notice: Subject to any disclaimer, the term of this patent is extended or adjusted under 35 U.S.C. 154(b) by 227 days.

(21) Appl. No.: 14/512,942

(22) Filed: Oct. 13, 2014

(65) Prior Publication Data

US 2016/0103016 A1 Apr. 14, 2016

(51) Int. Cl.
| | |
|---|---|
| *G01J 1/04* | (2006.01) |
| *G01J 1/02* | (2006.01) |
| *G01J 1/42* | (2006.01) |
| *F21V 23/04* | (2006.01) |
| *F21W 131/103* | (2006.01) |

(52) U.S. Cl.
CPC ........ *G01J 1/0448* (2013.01); *F21V 23/0464* (2013.01); *G01J 1/0271* (2013.01); *G01J 1/4204* (2013.01); *F21W 2131/103* (2013.01); *G01J 1/0266* (2013.01); *G01J 1/0425* (2013.01); *G01J 2001/4266* (2013.01)

(58) Field of Classification Search
CPC ....... G01J 1/0448; G01J 1/0271; G01J 1/4204
USPC ............. 250/239, 227.11; 362/276, 277, 362
See application file for complete search history.

(56) References Cited

U.S. PATENT DOCUMENTS

| | | |
|---|---|---|
| 681,461 A | 8/1901 | Stuart |
| 2,844,672 A | 7/1958 | Sambonet |
| 3,274,392 A | 9/1966 | Harling |
| 3,341,711 A | 9/1967 | Shepard |
| 3,497,863 A | 2/1970 | Horton et al. |
| 3,523,267 A | 8/1970 | Pauza |
| 3,584,228 A | 6/1971 | Kenyon |
| 3,650,190 A | 3/1972 | Miyagawa |
| 3,864,172 A | 2/1975 | Marks |
| 3,971,619 A | 7/1976 | Rohrssen |
| 4,477,143 A | 10/1984 | Taylor |
| 4,725,245 A | 2/1988 | Shea |
| 5,404,080 A | 4/1995 | Quazi |
| 5,431,580 A | 7/1995 | Tabata |
| 5,941,630 A | 8/1999 | Finke et al. |

(Continued)

FOREIGN PATENT DOCUMENTS

| | | |
|---|---|---|
| DE | 31 27 086 A1 | 1/1983 |
| GB | 2480234 A | 11/2011 |
| WO | 2007/003032 A1 | 1/2007 |

OTHER PUBLICATIONS

International Search Report, International Application No. PCT/US2015/054362, International Filing Date Oct. 7, 2015.

*Primary Examiner* — Kevin Pyo

(57) ABSTRACT

A light sensor assembly includes a base configured to be fixedly mounted to a housing of a light fixture. The base holds contacts configured to be electrically connected to terminals of the light fixture. A photocell module is provided on the base and includes a photocell electrically connected to the contacts. A sensor lid is coupled to the base. The sensor lid has a lightpipe directing light from an exterior of the sensor lid to the photocell. The sensor lid is variably positionable at different angular positions relative to the base to change an orientation of the lightpipe relative to the photocell.

20 Claims, 2 Drawing Sheets

(56) References Cited

U.S. PATENT DOCUMENTS

| | | | |
|---|---|---|---|
| 6,076,941 | A | 6/2000 | Hass et al. |
| 6,488,510 | B2 | 12/2002 | Li |
| 6,576,852 | B1 | 6/2003 | Shu |
| 6,634,902 | B1 | 10/2003 | Pirovic |
| 6,947,271 | B1 | 9/2005 | Gronowicz, Jr. |
| 9,077,112 | B2 | 7/2015 | Mitchell et al. |
| 9,148,936 | B2 | 9/2015 | Wagner et al. |
| 2003/0035102 | A1 | 2/2003 | Dimas et al. |
| 2003/0176087 | A1 | 9/2003 | Erez et al. |
| 2007/0001113 | A1 | 1/2007 | Langlois et al. |
| 2008/0067322 | A1 | 3/2008 | Stevens et al. |
| 2011/0284730 | A1 | 11/2011 | Sturdevant |
| 2015/0160305 | A1* | 6/2015 | Ilyes .................. G01R 31/44 324/414 |

* cited by examiner

LIGHT SENSOR ASSEMBLY

BACKGROUND OF THE INVENTION

The subject matter herein relates generally to light sensor assemblies.

On street lights and parking lot lights, photocells and the corresponding mating receptacles are typically used to turn the lights on and off based upon the ambient light from the sun. To ensure optimum photocell efficiency, it is important that the photocell light sensor points generally in the north direction. The aiming of the photocell is sometimes accomplished by drilling holes in the light fixture in proper positions, which is difficult and time consuming. Other light sensor assemblies have special mounting clips that allow orienting of the receptacle, however such mounting clips are difficult to install and manipulate. Also, such mounting clips tend to fail over time allowing the photocell to migrate and move out of true position over time.

A need remains for a light sensor assembly that allows aiming of the photocell with ease of field use and assembly.

BRIEF DESCRIPTION OF THE INVENTION

In one embodiment, a light sensor assembly is provided including a base configured to be fixedly mounted to a housing of a light fixture. The base holds contacts configured to be electrically connected to terminals of the light fixture. A photocell module is provided on the base and includes a photocell electrically connected to the contacts. A sensor lid is coupled to the base. The sensor lid has a lightpipe directing light from an exterior of the sensor lid to the photocell. The sensor lid is variably positionable at different angular positions relative to the base to change an orientation of the lightpipe relative to the photocell.

In another embodiment, a light sensor assembly is provided that includes a base configured to be fixedly mounted to a housing of a light fixture that holds contacts configured to be electrically connected to terminals of the light fixture. A photocell module is provided on the base that includes a photocell electrically connected to the contacts. A sensor lid is coupled to the base. The sensor lid has a top and a bottom with a side wall extending between the top and the bottom and with a cavity open at the bottom. The sensor lid has a lightpipe in the cavity. The lightpipe extends from a light receiving end to a light emitting end with the light receiving end being positioned at the side wall and the light emitting end being aligned with the photocell and directing light to the photocell. The sensor lid is variably positionable at different angular positions relative to the base to change an orientation of the lightpipe relative to the photocell. The light emitting end is aligned with the photocell at the various angular positions.

In a further embodiment, a light sensor assembly is provided including a base configured to be fixedly mounted to a housing of a light fixture. The base holds contacts configured to be electrically connected to terminals of the light fixture. The base is circular and has a central axis. A photocell module is provided on the base. The photocell module includes a photocell electrically connected to the contacts with the photocell being aligned with the central axis. A sensor lid is coupled to the base. The sensor lid has a top and a bottom with a side wall extending between the top and the bottom. The sensor lid has a circular cross-section. The sensor lid has a lightpipe extending from a light receiving end to a light emitting end. The light receiving end is positioned at the side wall and the light emitting end is aligned with the photocell along the central axis and directs light to the photocell. The sensor lid is rotatably coupled to the base and variably positionable at different angular positions relative to the base to change a facing direction of the light receiving end of the lightpipe. The light emitting end is aligned with the photocell at the various angular positions.

DETAILED DESCRIPTION OF THE INVENTION

Figure 1:
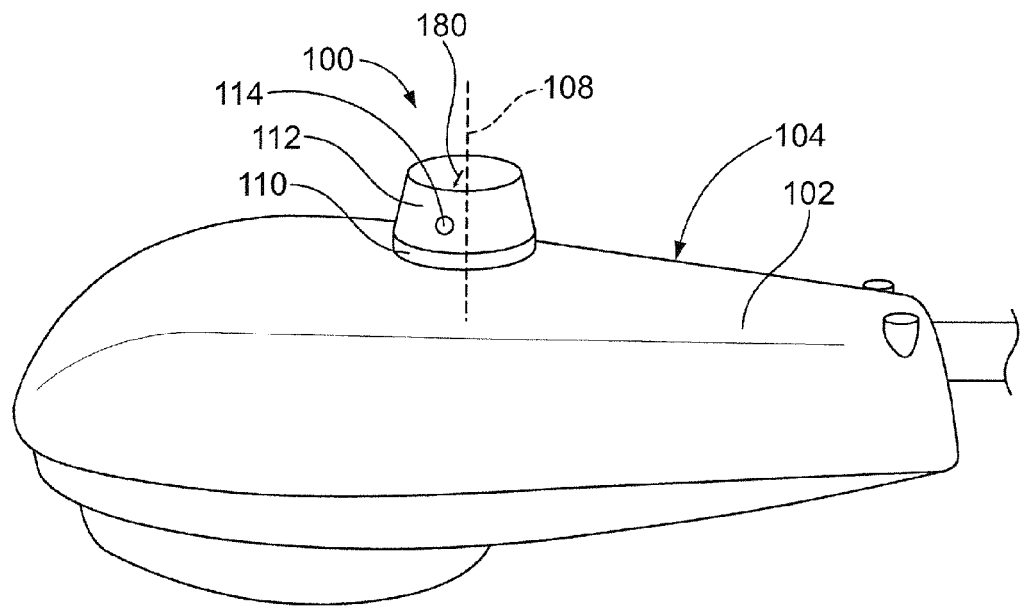
FIG. 1 illustrates a light sensor assembly formed in accordance with an exemplary embodiment.

FIG. 1 illustrates a light sensor assembly 100 formed in accordance with an exemplary embodiment. The light sensor assembly 100 is mounted to a housing 102 of a light fixture 104, such as a roadway light, a parking lot light, a street light, and the like. The light sensor assembly 100 holds one or more photocells 106 (shown in FIG. 2) that is/are used to turn the light fixture 104 on or off depending upon light levels. The photocell 106 is a light sensor used to detect ambient light from the sun. For proper operation, it is desirable that the light sensor assembly 100 be aimed in a particular direction, such as facing north, to receive the most diffuse ambient light for efficient operation of the light sensor assembly 100. The light sensor assembly 100 is rotatable about a central axis 108 to allow aiming of the light sensor assembly 100 in the desired direction.

The light sensor assembly 100 includes a base 110 that forms the bottom mating surface of the assembly 100, which may be mated to a receptacle or other connector that is fixedly mounted to the housing 102 of the light fixture 104. The light sensor assembly 100 includes a sensor lid 112 rotatably coupled to the base 110. The sensor lid 112 houses or surrounds the photocell 106, such as to provide environmental protection for the photocell 106. In an exemplary embodiment, the sensor lid holds a lightpipe 114 that directs light to the photocell 106. The lightpipe 114 is a structures used for transporting or distributing light. The lightpipe 114 may be an optical waveguide. Optionally, the lightpipe 114 may be a hollow structure that contains the light with a reflective lining and/or a reflector at the corner for redirecting the light. Optionally, the lightpipe 114 may be a transparent solid structure that contains and directs the light by total internal reflection. Other types of lightpipes may be used in alternative embodiments.

The lightpipe 114 is mechanically coupled to the sensor lid 112, and thus the lightpipe 114 may be positioned by positioning the sensor lid 112 relative to the base 110. Optionally, once positioned, the sensor lid 112 may be locked in position relative to the base 110 to maintain the position of the lightpipe 114, such as with the lightpipe 114 facing in the north direction. For example, the base 110 and/or the sensor lid 112 may include one or more locking features to lock the angular position of the sensor lid 112 relative to the base 110. The sensor lid 112 may be unlocked from the base 110 to change the angular position of the sensor lid 112 relative to the base 110 and then the sensor lid 112 may again be locked in position relative to the base 110.

Figure 3:
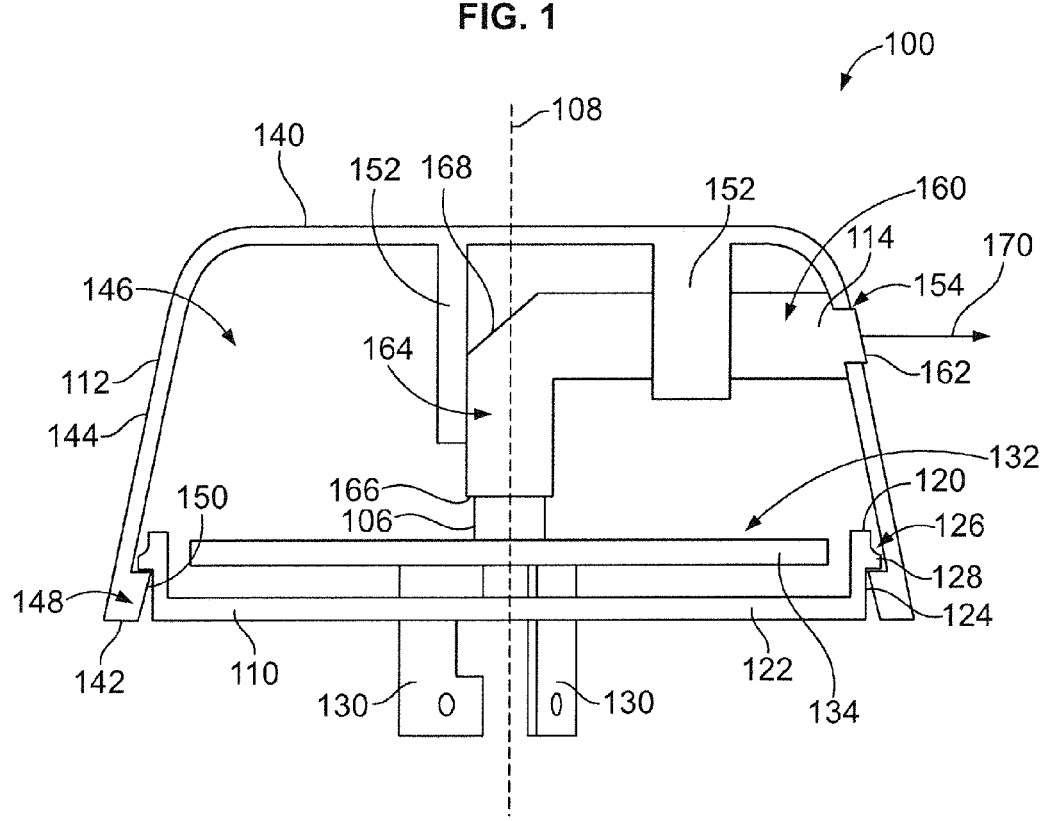
FIG. 3 is a cross sectional view of the light sensor assembly in an assembled state.
Figure 2:
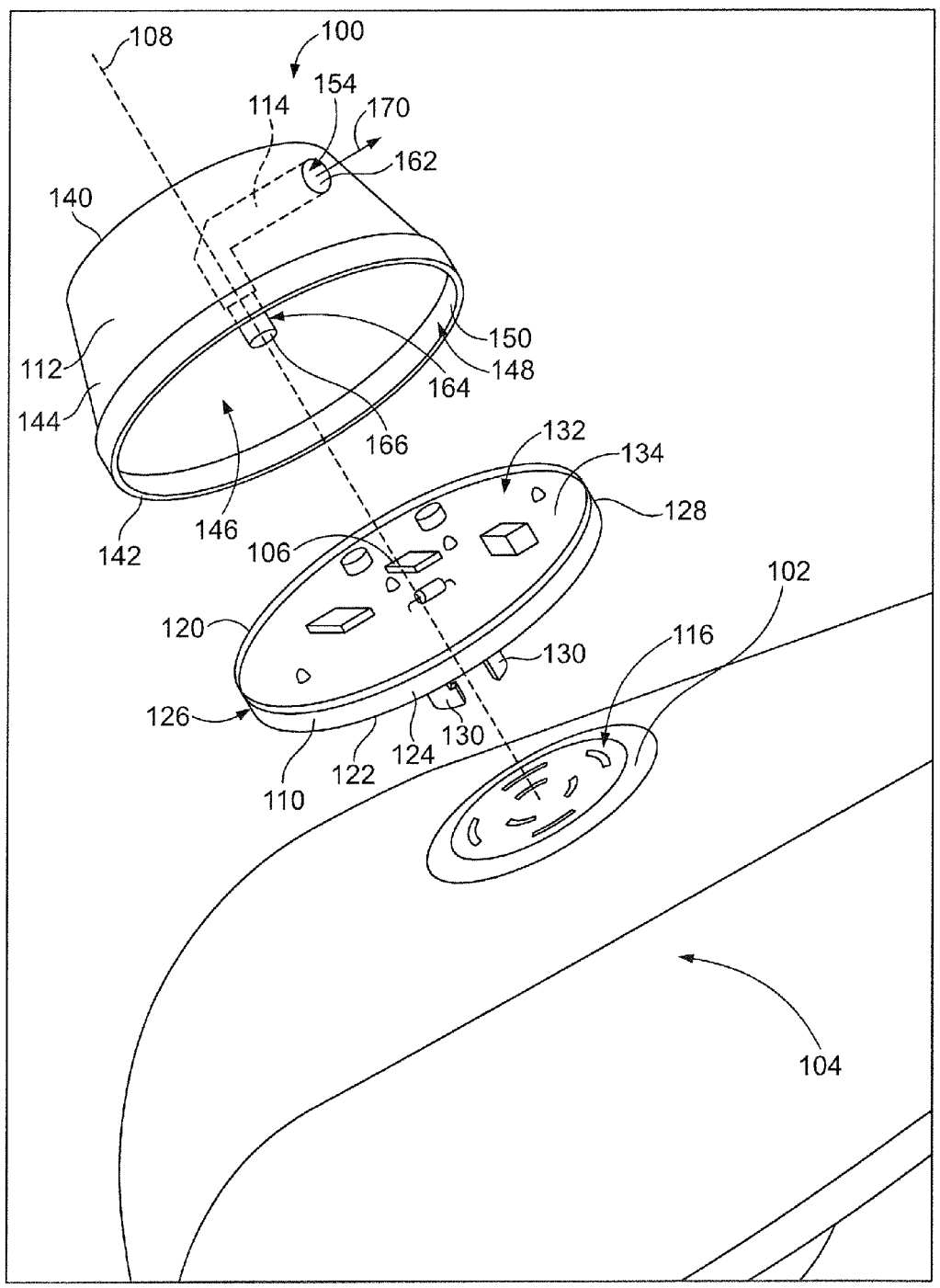
FIG. 2 is an exploded view of the light sensor assembly formed in accordance with an exemplary embodiment and shown relative to a light fixture.

FIG. 2 is an exploded view of the light sensor assembly 100 formed in accordance with an exemplary embodiment and shown relative to the light fixture 104. FIG. 3 is a cross sectional view of the light sensor assembly 100 in an assembled state.

The light fixture 104 includes a connector 116 for connecting the light sensor assembly 100 to the light fixture 104. The connector 116 may be a socket or receptacle connector. In various embodiments, the connector 116 may be a twist-lock receptacle to which the light sensor assembly 100 is connected. The connector 116 includes a series of openings that provide access to terminals (not shown) in the connector 116. The terminals may be terminated to ends of wires that are electrically connected to control the light source of the light fixture 104. The connector 116 may include fastener openings configured to receive fasteners (not shown) used to secure the base 110 to the housing 102 of the light fixture 104. Other types of securing members may be used to secure the base 110 to the housing 102 in alternative embodiments. Optionally, a seal (not shown) may be provided between the base 110 and the connector 116 or between the connector 116 and the housing 102 to seal the light fixture 104 from environmental containments such as water, debris, and the like.

The base 110 includes a top 120 and a bottom 122 opposite the top 120. The bottom 122 is configured to be secured to the connector 116. The base 110 includes a side wall 124 between the top 120 and the bottom 122. In an exemplary embodiment, the base 110 is circular to allow easy rotation of the sensor lid 112 relative to the base 110. However, the base 110 may have other shapes and alternative embodiments.

In an exemplary embodiment, the base 110 includes at least one base securing feature 126 used to secure the sensor lid 112 relative to the base 110. For example, the base 110 may include a clip or a flange 128 to secure the sensor lid 112 to the base 110. The flange 128 may be provided at the top 120. The flange 128 may extend entirely circumferentially around the base 110, or alternatively, one or more discrete flanges 128 may be provided at one or more locations around the base 110. The base securing feature 126 may allow rotation of the sensor lid 112 relative to the base 110 when engaged. Other fastening methods that secure sensor lid 112 to the base 110 may be employed, which may allow rotation of sensor lid 112 relative to base 110.

The light sensor assembly 100 includes a photocell module 132, which includes the photocell 106, a circuit board 134 and a plurality of contacts 130. The photocell 106 is mounted to the top of the circuit board 134 and is aligned with the central axis 108. The photocell 106 faces vertically upward and receives light from the lightpipe 114. The contacts 130 and photocell 106 are electrically connected via the circuit board 134 and may include additional componentry for signal conditioning. For example, the circuit board 134 may have control circuitry for controlling operation of the light fixture 104, such as including a daylight or nighttime control circuit, a timer circuit, a dimming circuit, and the like. In other alternative embodiments, the contacts 130 may be connected to the photocell 106 via wires.

The contacts 130 are held by the base 110. The contacts 130 extend downward from the bottom 122 of the base 110 and are arranged generally around the central axis 108, however the contacts 130 may be at different locations in alternative embodiments. The contacts 130 are configured to be plugged into the connector 116, such as into corresponding openings in the connector 116 when the base 110 is mounted to the connector 116. Optionally, the contacts 130 may be curved and fit in curved slots or openings in the connector 116 to mate with corresponding curved terminals of the connector 116. In an exemplary embodiment, the base 110 may be twisted or rotated to lock the contacts 130 in the connector 116, such as in electrical contact with the terminals of the connector 116. For example, the contacts 130 may be twist-lock contacts that are initially loaded into the openings in a vertical direction and the base 110 is then rotated, such as approximately 35 degrees, to lock the contacts 130 in the connector 116. Other types of mating arrangements between the contacts 130 and the connector 116 are possible in alternative embodiments.

The sensor lid 112 extends between a top 140 and a bottom 142. The sensor lid 112 has a side wall 144 between the top 140 and the bottom 142. The sensor lid 112 has a cavity 146 open at the bottom 142. The side wall 144 defines the cavity 146. In an exemplary embodiment, the sensor lid 112 has a circular cross-section, however other shapes are possible in alternative embodiments. Optionally, the side wall 144 may be tapered inward such that the top 140 has a smaller diameter then the bottom 142. The sensor lid 112 may be frustoconically shaped.

The sensor lid 112 includes a sensor lid securing feature 148 at or near the bottom 142 used to secure the sensor lid 112 to the base 110. For example, the sensor lid securing feature 148 may operably engage the base securing feature 126 to secure the sensor lid 112 to the base 110 while still allowing rotation of sensor lid 112 about the central axis 108. Optionally, the sensor lid securing feature 148 may include a latch 150 configured to be secured to the flange 128 of the base 110. The latch 150 may extend entirely circumferentially around the sensor lid 112, or alternatively, one or more discrete latches 150 may be provided at one or more locations around the sensor lid 112. The sensor lid securing feature 148 may allow rotation of the sensor lid 112 relative to the base 110 when engaged.

The lightpipe 114 is received in the cavity 146 and fixedly coupled to the sensor lid 112. For example, the sensor lid 112 includes one or more retention clips 152 extending into the cavity 146, such as from the top 140. The retention clips 152 secure the lightpipe 114 within the cavity 146 and ensure the emitting end of the lightpipe 114 is coaxially located above the photocell 106. In an exemplary embodiment, the sensor lid 112 includes an opening 154 in the side wall 144. A portion of the lightpipe 114 may extend into or through the opening 154. As such, the lightpipe 114 may be exposed to an exterior of the sensor lid 112 for receiving ambient light therethrough.

The lightpipe 114 has a light receiving segment 160 extending to a light receiving end 162 and a light emitting segment 164 extending to a light emitting end 166. The light emitting end 166 is opposite the light receiving end 162. The light receiving end 162 is exposed to the exterior of the sensor lid 112 to receive light therethrough. The lightpipe 114 is configured to direct the light received through the light receiving end 162 along the light receiving segment 160 and along the light emitting segment 164 to the light emitting end 166. The light emitting end 166 is aligned with the photocell 106 and directs the light from the lightpipe 114 to the photocell 106. The light is emitted from the lightpipe 114 through the light emitting end 166.

In an exemplary embodiment, the lightpipe 114 directs the light along a nonlinear path. For example, the light receiving segment 160 is angled transverse with respect to the light emitting segment 164. In an exemplary embodiment, the light receiving segment 160 is oriented generally perpendicular to the light emitting segment 164. As such, the face defining the light receiving end 162 is oriented generally perpendicular to the face defining the light emitting end 166. In an exemplary embodiment, the light receiving segment 160 extends generally horizontally and the light emitting segment 164 extends generally vertically. Other orientations are possible in alternative embodiments. In an exemplary embodiment, the lightpipe 114 includes an angled reflector 168 at the intersection between the light receiving segment 160 and the light emitting segment 164 that directs the light from the light receiving segment 160 into the light emitting segment 164.

In an exemplary embodiment, the light emitting end 166 is aligned with the central axis 108. The light emitting end 166 is coaxially aligned with the photocell 106 such that the lightpipe 114 directs the light to the photocell 106. The light emitting end 166 is configured to be aligned with the photocell 106 at each of the various angular positions of the sensor lid 112 relative to the base 110. For example, the photocell 106 remains stationary as the sensor lid 112 is moved or rotated to the various angular positions, and the light emitting end 166 of the lightpipe 114 is aligned with, and directs light to, the photocell 106 at each of the various angular positions. In an exemplary embodiment, the light emitting segment 164 extends along the central axis 108 such that the light is directed through the light emitting end 166 directly to the photocell 106. Rotation of the sensor lid 112 about the central axis 108 causes the light emitting segment 164 and light emitting end 166 to remain positioned directly vertically above the photocell 106, irrespective of the angular position of the sensor lid 112 relative to the base 110.

The light receiving end 162 faces the exterior of the sensor lid 112 in a facing direction 170. When the sensor lid 112 is moved or rotated relative to the base 110, the light receiving end 162 is moved with the sensor lid 112 as the sensor lid 112 is positioned at the various angular positions to change the facing direction 170 of the light receiving end 162. As such, the light receiving end 162 may be oriented in a particular facing direction, such as a north facing direction without moving the base 110 or the photocell module 132. The photocell 106 remains stationary with a portion of the lightpipe 114 directing light to the photocell 106 as the facing direction 170 of the light receiving end 162 is changed.

Optionally, the sensor lid 112 may have a direction indicator 180 (shown in FIG. 1) along the top 140 and/or side wall 144 to identify the location of the light receiving end 162. The installer may rotate the sensor lid 112 until the direction indicator 180 indicates that the light receiving end 162 is facing the desired direction, such as the North facing direction.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f), unless and until such claim limitations expressly use the phrase "means for" followed by a statement of function void of further structure.

What is claimed is:

1. A light sensor assembly comprising:
a twist-lock base configured to be mounted to a housing of a light fixture by twist-locking to the housing, the base holding twist-lock contacts configured to be electrically connected to terminals of the light fixture by a rotatable connection when the base is rotatably coupled to the housing;
a photocell module on the base, the photocell module including a photocell electrically connected to the contacts; and
a sensor lid coupled to the base, the sensor lid having a lightpipe directing light from an exterior of the sensor lid to the photocell, the sensor lid being rotatable about the base and variably positionable at different angular positions relative to the base to change an orientation of the lightpipe relative to the photocell.

2. The light sensor assembly of claim 1, wherein the lightpipe extends between a light receiving end and a light emitting end, the light emitting end being aligned with the photocell and directing light to the photocell.

3. The light sensor assembly of claim 2, wherein the light emitting end is aligned with the photocell at each of the various angular positions.

4. The light sensor assembly of claim 2, wherein the light receiving end is moved with the sensor lid as the sensor lid is positioned at the various angular positions to change a facing direction of the light receiving end.

5. The light sensor assembly of claim 1, wherein the photocell remains stationary as the sensor lid is moved to the various angular positions.

6. The light sensor assembly of claim 1, wherein the photocell is positioned along a central axis of the light sensor assembly, the sensor lid rotating about the central axis with the lightpipe directing the light along the central axis toward the photocell at each of the various angular positions.

7. The light sensor assembly of claim 6, wherein the lightpipe includes a light emitting end aligned with the central axis.

8. The light sensor assembly of claim 1, wherein the sensor lid includes a top and a bottom, the sensor lid including a side wall extending between the top and the bottom, the lightpipe being exposed at the side wall to receive light.

9. The light sensor assembly of claim 1, wherein the lightpipe has a light receiving segment extending to a light receiving end and a light emitting segment extending to a light emitting end, the light receiving segment being angled transverse with respect to the light emitting segment.

10. The light sensor assembly of claim 9, wherein the light receiving segment is oriented generally perpendicular to the light emitting segment.

11. The light sensor assembly of claim 1, wherein the sensor lid includes a sensor lid securing feature configured to clip onto the base and allow the sensor lid to be rotatably coupled to the base to change the relative position of the sensor lid with respect to the base.

12. The light sensor assembly of claim 1, wherein the photocell module includes a circuit board, the photocell being mounted to the circuit board.

13. The light sensor assembly of claim 1, wherein the sensor lid includes a cavity extending along a central axis, the lightpipe being received in the cavity and extending from the central axis toward a side wall of the sensor lid, the photocell module being received in the cavity below the lightpipe with the photocell aligned with the central axis.

14. The light sensor assembly of claim 1, further comprising a direction indicator on a top of the sensor lid, the sensor lid being rotated until the direction indicator is positioned generally north.

15. A light sensor assembly comprising:
a base configured to be rotatably mounted to a housing of a light fixture, the base holding twist-lock contacts configured to be electrically connected to terminals of the light fixture by a rotatable connection when the base is rotatably coupled to the housing;
a photocell module on the base, the photocell module including a photocell electrically connected to the contacts; and
a sensor lid coupled to the base, the sensor lid having a top and a bottom with a side wall extending between the top and the bottom, the sensor lid having a cavity open at the bottom, the sensor lid having a lightpipe in the cavity, the lightpipe extending from a light receiving end to a light emitting end, the light receiving end being positioned at the side wall, the light emitting end being aligned with the photocell and directing light to the photocell, the sensor lid being rotatable about the base and variably positionable at different angular positions relative to the base to change an orientation of the lightpipe relative to the photocell, the light emitting end being aligned with the photocell at the various angular positions.

16. The light sensor assembly of claim 15, wherein the light receiving end is moved with the sensor lid as the sensor lid is positioned at the various angular positions to change a facing direction of the light receiving end, and wherein the photocell remains stationary as the sensor lid is moved to the various angular positions.

17. The light sensor assembly of claim 15, wherein the photocell is positioned along a central axis of the light sensor assembly, the sensor lid rotating about the central axis with the lightpipe directing the light along the central axis toward the photocell at each of the various angular positions.

18. The light sensor assembly of claim 17, wherein the light emitting end is aligned with the central axis.

19. The light sensor assembly of claim 15, wherein the sensor lid includes a sensor lid securing feature configured to clip onto the base and allow the sensor lid to be rotatably coupled to the base to change the relative position of the sensor lid with respect to the base.

20. A light sensor assembly comprising:
a base configured to be rotatably mounted to a housing of a light fixture, the base holding contacts configured to be electrically connected to terminals of the light fixture by a rotatable connection when the base is rotatably coupled to the housing, the base being circular and having a central axis;
a photocell module on the base, the photocell module including a photocell electrically connected to the contacts, the photocell being aligned with the central axis; and
a sensor lid coupled to the base, the sensor lid having a top and a bottom with a side wall extending between the top and the bottom, the sensor lid having a circular cross-section, the sensor lid having a lightpipe extending from a light receiving end to a light emitting end, the light receiving end being positioned at the side wall, the light emitting end being aligned with the photocell along the central axis and directing light to the photocell, the sensor lid being rotatably coupled to the base and variably positionable at different angular positions relative to the base to change a facing direction of the light receiving end of the lightpipe, the light emitting end being aligned with the photocell at the various angular positions.

* * * * *